United States Patent
Bartels et al.

(10) Patent No.: US 8,403,262 B2
(45) Date of Patent: Mar. 26, 2013

(54) OVERHEAD LUGGAGE COMPARTMENT WITH A MOUNTING FOR A CONTROL UNIT

(75) Inventors: Benjamin Bartels, Hamburg (DE); Klaus Hanna, Hamburg (DE)

(73) Assignee: Airbus Operations GmbH, Hamburg (DE)

(*) Notice: Subject to any disclaimer, the term of this patent is extended or adjusted under 35 U.S.C. 154(b) by 244 days.

(21) Appl. No.: 13/014,942

(22) Filed: Jan. 27, 2011

(65) Prior Publication Data

US 2011/0180664 A1 Jul. 28, 2011

Related U.S. Application Data

(60) Provisional application No. 61/298,626, filed on Jan. 27, 2010.

(30) Foreign Application Priority Data

Jan. 27, 2010 (DE) .................. 10 2010 005 905

(51) Int. Cl.
    *B64D 31/04* (2006.01)
    *A47F 5/08* (2006.01)
(52) U.S. Cl. ............. 244/118.5; 244/118.1; 244/118.6; 312/245; 312/246; 312/247; 312/248
(58) Field of Classification Search ............. 244/118.1, 244/118.5, 118.6; 312/245–248
See application file for complete search history.

(56) References Cited

U.S. PATENT DOCUMENTS

| | | | | |
|---|---|---|---|---|
| 5,011,239 A * | 4/1991 | Guerin | ................... | 312/248 |
| 5,443,312 A * | 8/1995 | Schluter | ................ | 312/334.27 |
| 5,467,954 A * | 11/1995 | Wekell | ................ | 248/201 |
| 5,743,487 A * | 4/1998 | Rice | ................ | 244/1 R |
| 6,520,605 B2 * | 2/2003 | Nunokawa et al. | ......... | 312/111 |
| 6,690,574 B2 * | 2/2004 | Kasahara et al. | ......... | 360/99.15 |
| 7,377,603 B2 * | 5/2008 | Quijano | ................ | 312/245 |

FOREIGN PATENT DOCUMENTS

EP 1260413 A2 11/2002

* cited by examiner

*Primary Examiner* — Tien Dinh
*Assistant Examiner* — Michael Wang
(74) *Attorney, Agent, or Firm* — The Webb Law Firm

(57) ABSTRACT

An overhead luggage compartment is provided with a mounting for a control unit, having a first, top guide, which is fastened in the overhead luggage compartment. A second, bottom guide extends below and at least substantially parallel to the first guide. The first guide comprises a horizontal, first portion adjoined in an inward direction of the luggage compartment by a second portion, which extends obliquely upwards from the level of the first portion. The first portion of the first guide and the second guide are telescopically extensible in horizontal direction. The second guide is open in the direction of the first guide. A first suspension point is coupled rotatably to the outer end of the extensible portion of the first guide. A second suspension point is disposed inwards of the first suspension point and configured for displaceable engagement with the first portion and the second portion of the first guide. A third suspension point is disposed below the first suspension point and the second suspension point and configured for displaceable engagement with the second guide.

11 Claims, 2 Drawing Sheets

OVERHEAD LUGGAGE COMPARTMENT WITH A MOUNTING FOR A CONTROL UNIT

Figure 1:
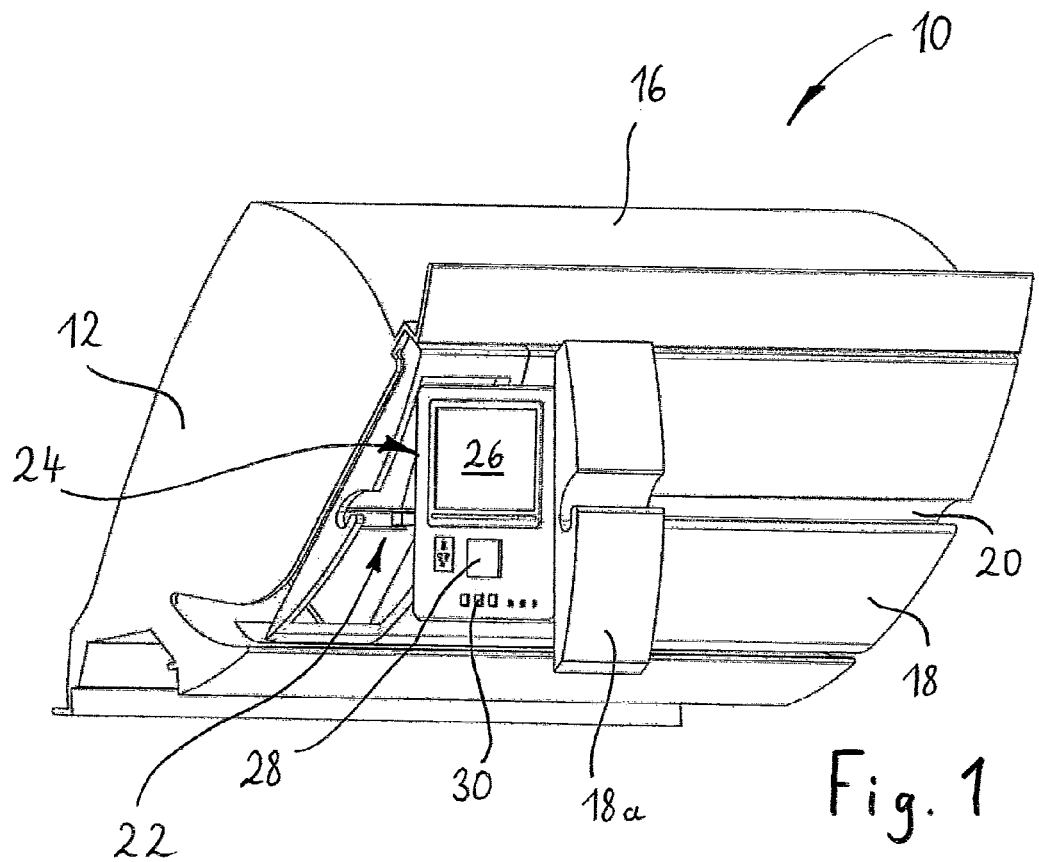

The invention relates to an overhead luggage compartment with a mounting for a control unit, such as is used in particular in passenger aircraft.

By the term "control unit" in the context of the present invention are meant electrical and electronic devices that are used for remote control of for example an air conditioning system or alternatively a so-called in-flight entertainment system. Up till now such control units have been attached, as a rule by screwing, to fixed walls in for example an aircraft cabin. For this purpose a base plate is fastened by screws to a fixed wall (so-called monument wall), which may be the outer wall of a galley or a toilet, the base plate in turn having threaded holes at the requisite points for attaching the control unit by means of corresponding further screws to the base plate. The control unit, which nowadays often also comprises a display screen, is supplied in component parts and fastened part by part to the base plate. The electrical connections then still have to be established.

It is clear that the conventional installation of a control unit is time-consuming and labor-intensive. Furthermore, a conventionally installed control unit may be intrusive as it projects from the fixed wall and, particularly given the confined spatial conditions in an aircraft cabin, leads to obstructions. Finally, a conventionally installed control unit cannot easily be exchanged for a newer model because the external dimensions of newer models often differ from those of the control unit to be replaced, for example owing to a larger display in the new control unit. It is then necessary to remove not only the old control unit but also the old base plate, replace the old base plate with a new base plate having appropriate mounting points and then mount the new control unit. Finally, the conventional type of fastening is to a certain extent aesthetically unsatisfactory as the fastening elements that are still visible after a control unit has been mounted (for example the heads of the fastening screws) mar the appearance of the adjacent surface, even when for example the screw heads have been concealed by caps.

The underlying object of the invention is therefore to indicate a solution for installing such a control unit that eliminates the previously described problems.

This object is achieved according to the invention by an overhead luggage compartment having the features indicated in claim 1. The present invention accordingly first breaks with the tradition of installing control units of the described type on a fixed cabin wall. Rather, the invention proposes to mount such a control unit in an overhead luggage compartment, from which it projects only while in use. In order to achieve this, the overhead luggage compartment is equipped according to the invention with a mounting for a control unit. The mounting comprises a first, top guide, which is fastened in the overhead luggage compartment, and a second, bottom guide, which is fastened likewise in the overhead luggage compartment and extends below and substantially parallel to the first guide. The first guide has a horizontal, first portion adjoined in an inward direction of the luggage compartment by a second portion, which extends obliquely upwards from the level of the first portion. The first portion of the first guide and the second guide are configured in such a way that they are telescopically extensible and retractable in horizontal direction, wherein the second guide is open at its upper side, i.e. in the direction of the first guide.

A first suspension point of the mounting is coupled rotatably to the outer end of the extensible portion of the first guide. A second suspension point, which is disposed inwards of the first suspension point preferably at the same level, is configured for displaceable engagement with the first portion and the second portion of the first guide, while a third suspension point, which is disposed below the first two suspension points, is configured for displaceable engagement with the second guide.

An overhead luggage compartment fashioned in such a way offers the possibility of stowing control units of differing shape and size out of sight in the overhead luggage compartment while not in use, withdrawing them—under the guidance of the mounting—from the overhead luggage compartment for use, and after use sliding them back into the overhead luggage compartment. The angular, top guide ensures that a control unit fastened to the mounting rotates in a way that also allows larger control units to be stowed in the overhead luggage compartments, the cross section of which usually reduces in a downward direction. The angular top guide moreover effects a specific lowering of the control unit as it is withdrawn from the overhead luggage compartment, with the result that the control unit in the extended state may be operated also by shorter persons.

According to a preferred form of construction the three suspension points are fastened to a base plate, which in turn is configured for mounting of the control unit. For example, a control unit may be fitted into such a base plate and releasably locked, thereby allowing easy mounting and dismounting of the control unit, for example for servicing purposes or an exchange.

According to another preferred form of construction the three suspension points are fastened directly to a rear wall of the control unit itself, thereby eliminating the need for a separate base plate.

The two guides of the mounting may be incorporated at least partially in the form of grooves in a side wall or partition of an overhead luggage compartment. In preferred embodiments, the first guide and the second guide take the form of guide rails, wherein the second portion of the first guide may be disposed laterally offset relative to the first portion of the first guide. This last feature is advantageous for example if the telescopically extensible first portion of the first guide during extension is to move at least partly past the second portion of the first guide.

According to the invention, by virtue of the rotatable coupling of the first suspension point to the outer end of the extensible portion of the first guide, this portion is moved positively inwards and outwards during withdrawal of the control unit from the luggage compartment and during a subsequent stowing of the control unit in the luggage compartment. In preferred forms of construction the first portion of the first guide and the second guide are connected to one another by at least one coupling element for transmitting the telescopic extending- and retracting motion of the first portion of the first guide to the second guide. The coupling element may be for example a simple connecting rod between the first portion of the first guide and the second guide but is preferably a thrust plate, which extends over a major part or over the entire length of the first portion of the first guide and is also fastened to the second guide over a major length, for example along a part or over the entire length of an extensible portion of the second guide. Such a form of construction comprising a thrust plate is lent a greater stiffness as a result of the thrust plate.

In preferred forms of construction the second suspension point and the third suspension point take the form of sliding bolts or rollers, which may slide or roll in the first guide and/or the second guide. The first suspension point also may take the form of a sliding bolt or roller but then has to be locked against displacement by means of for example a catch on the outer end of the first portion of the first guide in order to allow the retracting- and extending motion of the control unit to be transmitted to the first portion of the first guide. Alternatively, the first suspension point may be merely a pivot bearing, to which the outer end of the first portion of the first guide is fastened.

For aesthetically pleasing integration of the mounting into the overhead luggage compartment, in preferred forms of construction a lateral outer face of the mounting is fashioned by a portion of a lid, the remaining part of which is used to close the overhead luggage compartment. This lid portion may have a ridge-shaped handle that enables the control unit to be comfortably pulled out of the luggage compartment and pushed into the luggage compartment. The ridge-shaped handle may be arranged countersunk in the lid portion and may, independently of its concrete form, continue in the remaining part of the lid. Alternatively, the retraction and extension of the mounting may be effected by means of an electric drive. On the lid portion there may then be for example two pushbuttons, by means of which the extension and retraction of the mounting may be controlled.

Independently of whether the retraction and extension of the mounting is effected manually or by motor, a locking device may be provided, which releasably fixes the mounting in the extended state. Such a releasable fixing in the extended state may facilitate operation of the control unit as the control unit does not inadvertently move away during an operating process.

In principle, the first guide and the second guide may be mounted in a self-supporting manner in the overhead luggage compartment. Preferably, however, the two guides are fastened to, or in, a side wall or a partition of the overhead luggage compartment.

Figure 2:
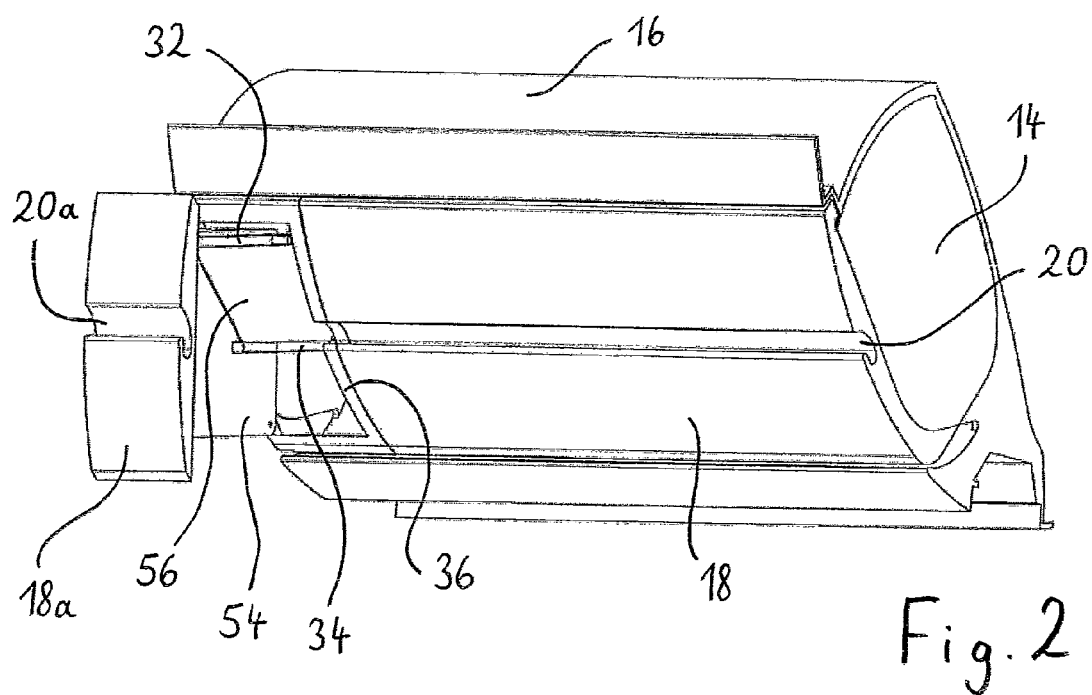
Figure 3:
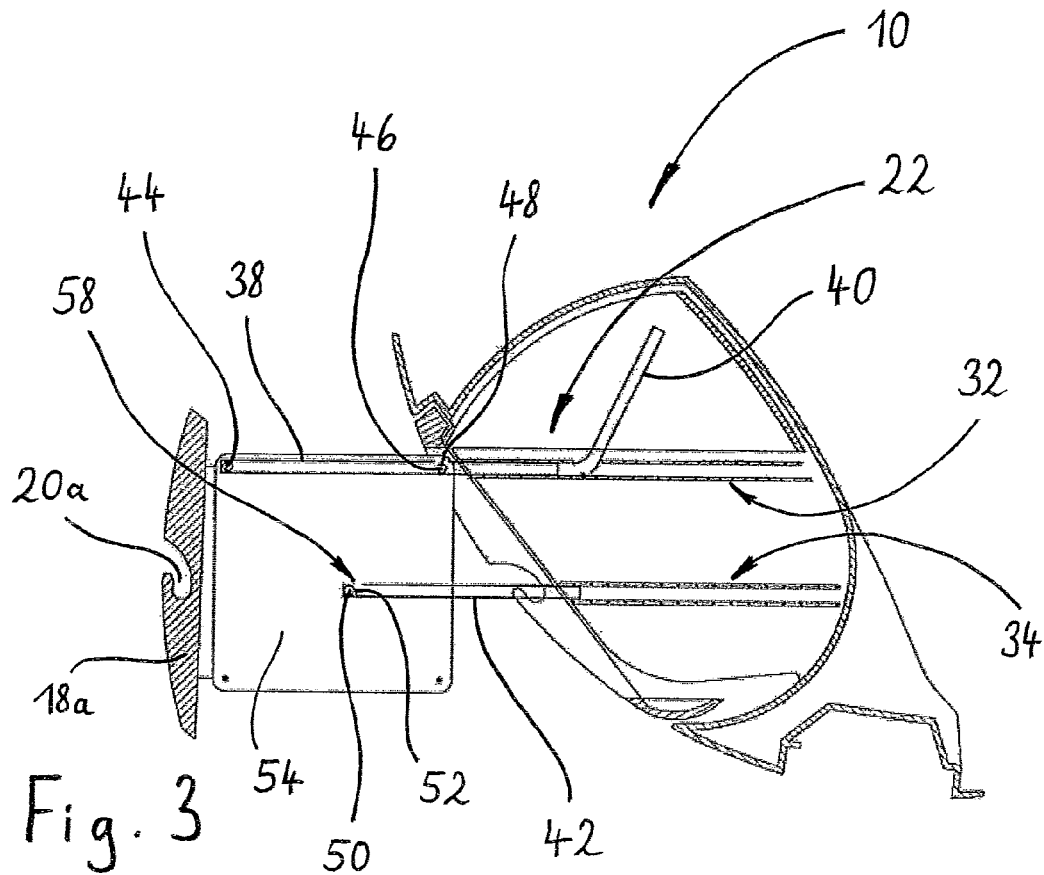
Figure 4:
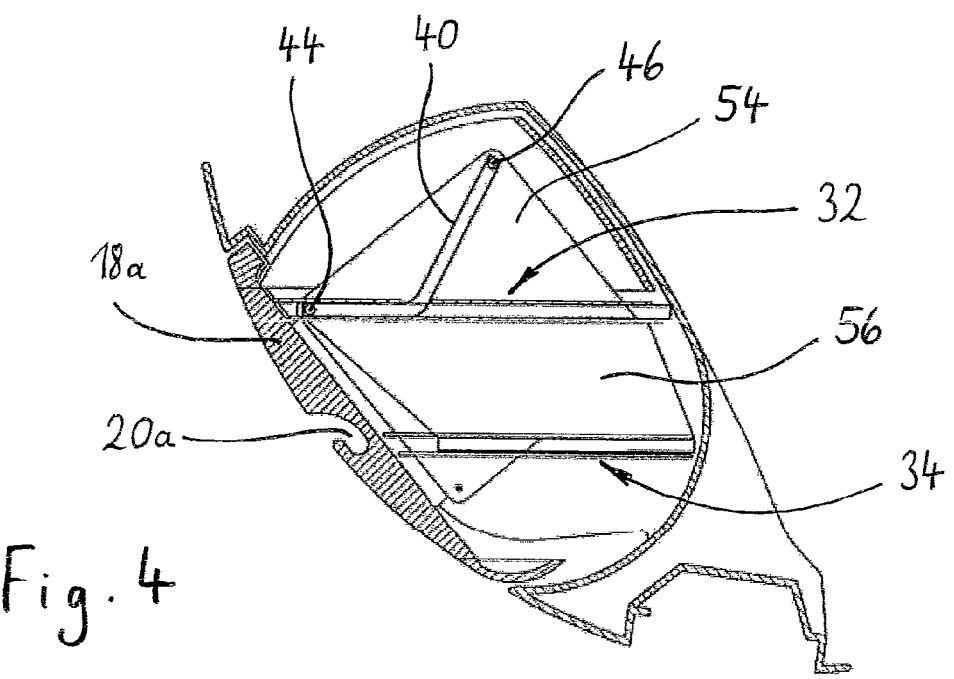

A currently preferred embodiment of an overhead luggage compartment according to the invention is described in detail below with reference to diagrammatic drawings. The drawings show:

FIG. 1 a three-dimensional representation of an overhead luggage compartment according to the invention with a mounting for a control unit, wherein a control unit fitted on the mounting is represented in an extended state, FIG. 2 the overhead luggage compartment of FIG. 1 in a three-dimensional representation viewed from another direction, FIG. 3 a cross section through the overhead luggage compartment of FIG. 1 with the mounting for the control unit in an extended state, and FIG. 4 the cross section of FIG. 3 but with the mounting for the control unit in the retracted state.

FIGS. 1 and 2 show perspective views of an overhead luggage compartment generally denoted by 10, such as is used for example in the cabin of a passenger aircraft. The overhead luggage compartment 10 has side walls 12, 14 and a rear wall 16 extending rearwards from the top, these walls delimiting an interior of the overhead luggage compartment 10 that is closable by means of a lid 18. The lid 18 for ease of opening and closing is provided with a countersunk ridge-shaped handle 20 that extends approximately in the middle of the lid 18 over the entire width thereof.

In a part of the overhead luggage compartment 10 that adjoins the, in FIGS. 1 and 2 left, side wall 12 a mounting 22 for a control unit 24 is fastened, by means of which the control unit 24 may be moved out of the overhead luggage compartment 10 for use and stowed after use back in the overhead luggage compartment 10. For this purpose a lateral outer face of the mounting 22 is formed by a portion 18*a* of the lid 18 that also has a ridge-shaped handle portion 20*a* of the ridge-shaped handle 20. In the illustrated embodiment the control unit 24 has a display 26 as well as various function keys 28, 30. The control unit may be for example the control unit of a so-called inflight entertainment system, by means of which the cabin crew may control functions of the inflight entertainment system.

The mounting 22 comprises a first, top guide 32 as well as a second, bottom guide 34, both of which are fastened in the overhead luggage compartment 10, in the illustrated embodiment to a partition 36 that subdivides the interior of the overhead luggage compartment 10. Both guides 32, 34 in this embodiment take the form of guide rails that are fastened to the face of the partition 36 facing the side wall 12.

The first guide 32 has a horizontal, first portion 38 that is telescopically extensible and retractable in horizontal direction. Adjoining this first portion 38 in an inward direction of the luggage compartment is a second portion 40, which as represented extends obliquely upwards from the level of the first portion 38 in the luggage compartment 10. The bottom, second guide 40 extends parallel to the first portion 38 of the top guide 32 and likewise has a portion 42 that is telescopically extensible and retractable in horizontal direction.

For interaction with the two guides 32 and 34 the mounting 22 is provided with three suspension points, of which a first suspension point 44 is coupled rotatably to the outer end of the first portion 38 of the first guide 32. In the illustrated embodiment the outer end of the first portion 38 is supported rotatably on the first suspension point 44, so that the first suspension point 44 cannot be displaced relative to the first portion 38 but transmits any translatory motion to the first portion 38.

A second suspension point 46 in the form of a sliding bolt 48 is disposed inwards of, and at the same level as, the first suspension point 44. The sliding bolt 48 is received in the first guide 32 and is slidingly displaceable therein.

A third suspension point 50 in the form of a sliding bolt 52 is disposed below and approximately midway between the first two suspension points 44, 46. The sliding bolt 52 is intended to interact with the second guide 34 and is slidingly displaceable therein.

In the illustrated embodiment the three suspension points 44, 46 and 50 are formed on the rear of a base plate 54, which forms part of the mounting 22 and to the front of which the control unit 24 is attachable by fastening means that are not represented here, for example by fitting the control unit 24 into the base plate 54 and locking it releasably to the base plate 54, by latching the control unit 24 in the base plate 54 (by means of suitable interactive detent elements on the control unit and the base plate), by screw-fastening the control unit 24 to the base plate 54 etc. The portion 18*a* of the lid 18 is fastened to the lateral face of the mounting 22 facing the outside of the luggage compartment 10.

There now follows a detailed description of the function of the mounting 22, starting from the extended state shown in FIGS. 1 and 3. When the control unit 24 is no longer required, a user presses on the lid portion 18*a* in order to push the control unit 24 into the overhead luggage compartment 10. The pressure applied by the user upon the lid portion 18*a* leads first to a translatory motion, in the course of which the three suspension points 44, 46 and 50 are displaced in an inward direction of the luggage compartment 10 along the first guide 32 and/or the second guide 34. Because the first suspension point 44 cannot be displaced relative to the first position 38 of the first guide 32 but may only rotate, in the course of the described translatory motion the first portion 38 is moved telescopically inwards into the first guide 32. In order to transmit this retracting motion also to the portion 42 of the second guide 34, a thrust plate 56 that rigidly connects the first portion 38 of the first guide 32 to the portion 42 of the second guide 34 is provided (see FIGS. 2 and 4). The portion 42 of the second guide 34 therefore retracts and extends synchronously with the first portion 38 of the first guide 32.

As soon as the second suspension point 46 configured here as sliding bolt 48 reaches the bottom end of the second portion 40 of the first guide 32 and is moved further inwards, the base plate 54 with the control unit 24 fastened thereto starts to rotate about the first suspension point 44, in FIG. 3 in an anticlockwise direction. The sliding bolt 48 travels upwards in the second portion 40 of the first guide 32, with simultaneous further pivoting of the base plate 54 in the described direction of rotation.

As a result of the described pivoting motion of the base plate 54, at the very start thereof the third suspension point 50 configured here as sliding bolt 52 is lifted up out of the second guide 34. In order to allow this, the second guide 34 at least at 58 is open in an upward direction, so that the sliding bolt 52 may move up out of the portion 42 of the guide 34.

The end point of the retracting motion is reached when the lid portion 18a terminates flush with the remaining part of the closed lid 18. In this position the first portion 38 of the first guide 32 and the portion 42 of the second guide 34 are fully retracted and the second suspension point 46 occupies a position at the top, inner end of the first guide 32, more precisely at the top, inner end of the second portion 40 of the first guide 32. The third suspension point 50 has left the second guide 34 and is situated at a point between the first guide 32 and the second guide 34 (see FIG. 4, in which the third suspension point 50 is concealed by the thrust plate 56).

To pull the control unit 24 out, a user takes hold of the ridge-shaped handle portion 20a and exerts a tensile force, whereupon the previously described retraction process runs off in the reverse direction. The moment the second suspension point 46 reaches the horizontal level of the first guide 32, the third suspension point 50 also passes through the open point 58 into the second guide 34 and the rotational movement of the base plate 54 is terminated. The further extending motion occurs in a purely translatory manner up to the state reproduced in FIG. 3, in which the control unit 24 may be comfortably operated (see also FIG. 1).

The invention claimed is:

1. An overhead luggage compartment with a mounting for a control unit, wherein the mounting comprises:
   a first, top guide, which is fastened in the overhead luggage compartment,
   a second, bottom guide, which is fastened in the overhead luggage compartment and extends below and at least substantially parallel to the first guide,
   wherein
      the first guide comprises a horizontal, first portion adjoined in an inward direction of the luggage compartment by a second portion, which extends obliquely upwards from the level of the first portion,
      the first portion of the first guide and the second guide are telescopically extensible in horizontal direction, and
      the second guide is open in the direction of the first guide,
   a first suspension point, which is coupled rotatably to the outer end of the extensible portion of the first guide,
   a second suspension point, which is disposed inwards of the first suspension point and configured for displaceable engagement with the first portion and the second portion of the first guide, and
   a third suspension point, which is disposed below the first suspension point and the second suspension point and configured for displaceable engagement with the second guide, which disengages from the second guide when the control unit is stored,
   wherein the overhead luggage compartment is mounted in an aircraft cabin.

2. The overhead luggage compartment according to claim 1, wherein the three suspension points are fastened to a base plate, which is configured for mounting of the control unit.

3. The overhead luggage compartment according to claim 1, wherein the three suspension points are fastened directly to a rear wall of the control unit.

4. The overhead luggage compartment according to claim 1, wherein the first guide and the second guide take the form of guide rails.

5. The overhead luggage compartment according to claim 4, wherein the second portion of the first guide is disposed laterally offset relative to the first portion.

6. The overhead luggage compartment according to claim 5, wherein the first portion of the first guide and the second guide are connected to one another by at least one coupling element for transmitting the telescopic extending and retracting motion of the first portion of the first guide to the second guide.

7. The overhead luggage compartment according to claim 4, wherein the first portion of the first guide and the second guide are connected to one another by at least one coupling element for transmitting the telescopic extending and retracting motion of the first portion of the first guide to the second guide.

8. The overhead luggage compartment according to claim 7, wherein the coupling element is a thrust plate that connects the first portion of the first guide to the second guide.

9. The overhead luggage compartment according to claim 1, wherein the second suspension point and the third suspension point take the form of sliding bolts or rollers.

10. The overhead luggage compartment according to claim 1, wherein a lateral outer face of the mounting is fashioned by a portion of a lid that is used to close the overhead luggage compartment.

11. The overhead luggage compartment according to claim 1, wherein the first guide and the second guide are fastened to or in a side wall or a partition of the overhead luggage compartment.

* * * * *